United States Patent [19]

Takada et al.

[11] Patent Number: 4,964,913
[45] Date of Patent: Oct. 23, 1990

[54] HIGH BENDING STRENGTH, LARGE IMPACT STRENGTH HYDRAULIC SUBSTANCES REINFORCED WITH ACRYLONITRILE FIBERS AND A PROCESS FOR PRODUCTION THEREOF

[75] Inventors: Takashi Takada; Kenichi Hirao, both of Otsu, Japan

[73] Assignee: Toray Industries, Inc., Tokyo, Japan

[21] Appl. No.: 338,838

[22] Filed: Apr. 14, 1989

Related U.S. Application Data

[60] Continuation of Ser. No. 39,837, Apr. 17, 1987, abandoned, which is a continuation of Ser. No. 728,917, Apr. 30, 1985, abandoned, which is a division of Ser. No. 688,393, Jan. 2, 1985, abandoned.

[30] Foreign Application Priority Data

Jun. 19, 1984 [JP] Japan ................................ 59-125818

[51] Int. Cl.$^5$ ................................................ C04B 7/02
[52] U.S. Cl. ..................... 106/808; 428/364; 428/400; 524/5
[58] Field of Search ................... 106/90, 99; 428/364, 428/400; 526/341, 342; 264/206, 210.7

[56] References Cited

U.S. PATENT DOCUMENTS

| | | |
|---|---|---|
| 3,088,188 | 5/1963 | Knudsen . |
| 4,140,844 | 2/1979 | Lohwasser ........................ 526/341 |
| 4,306,911 | 12/1981 | Gordon . |
| 4,414,031 | 3/1983 | Studinka . |
| 4,446,206 | 5/1984 | Fester et al. ........................ 428/364 |
| 4,448,740 | 5/1984 | Sawanishi et al. .................. 264/182 |
| 4,497,868 | 2/1985 | Reinehr . |
| 4,535,027 | 8/1985 | Kobashi et al. ...................... 428/364 |
| 4,883,628 | 11/1989 | Kwon ............................. 264/182 X |
| 4,913,870 | 4/1990 | Schellekens et al. ............... 264/182 |

Primary Examiner—Lorraine T. Kendell
Attorney, Agent, or Firm—Armstrong, Nikaido, Marmelstein, Kubovcik & Murray

[57] ABSTRACT

Hydraulic substances reinforced with high tenacity acrylonitrile (AN) fibers and a process for production thereof are provided.

The high tenacity AN fibers comprise AN polymers composed mainly of AN having an intrinsic viscosity of at least 2.5 and have an X-ray crystalline orientation of at least 93%, a tensile strength of at least 10 g/d, an initial modulus of at least 180 g/d, a contrast glossiness of at least 10% and a smooth surface.

Hydraulic substances reinforced with the high tenacity AN fiber are produced by uniformly dispersing in water, a hydraulic substance and the high tenacity AN fibers having applied thereto nonionic or cationic high molecular flocculants, adding anionic high molecular flocculants thereto to flocculate and adsorb cement particles onto the surface of the AN fibers and, subjecting the resulting slurry to paper-making.

5 Claims, No Drawings

HIGH BENDING STRENGTH, LARGE IMPACT STRENGTH HYDRAULIC SUBSTANCES REINFORCED WITH ACRYLONITRILE FIBERS AND A PROCESS FOR PRODUCTION THEREOF this application is a continuation of application Ser. No. 07/039,837, filed Apr. 17, 198, now abandoned which is a continuation of application Ser. No. 06/728,917, filed Apr. 28, 1985, now abandoned which, in turn, is a divisional of application Ser. No. 06/688,393 filed Jan. 2, 1985, now abandoned.

BACKGROUND OF THE INVENTION.

The present invention relates to a high bending strength, large impact strength hydraulic substance reinforced with high tenacity acrylonitrile (hereinafter abbreviated as AN) fibers, particularly AN fibers which are obtained by dry-jet wet spinning of an AN polymer having a high degree of polymerization and which have an extremely high mechanical strength, a remarkable smoothness at the surface thereof and a dense and homogeneous fiber structure, as compared to conventional and commercially available AN fibers, and a process for production of the reinforced hydraulic substance.

Asbestos has been hitherto used as a reinforcement for hydraulic substances such as cement or gypsum. Methods for producing asbestos-reinforced plane plates, corrugated plate slates, etc. include wet paper-making methods such as the cylinder mould type and fourdrinier type. A cylinder mould type paper-making method called the Hatcheck's method has acquired a reputation as a preferable method. The asbestos fibers for reinforcing cement have a very good affinity and a strong adhesion force to a cement matrix. The presence of long fibers with short fibers in an approximately mixed state enhances the efficiency of paper-making and makes the reinforcing effect satisfactory. Therefore, asbestos fibers are ideal fibers for use in cement reinforcement.

However, due to the recently revealed harmful nature of asbestos fibers, handling becomes a problem on a world-wide basis. Therefore, the development of substitute materials for use as an alternative to asbestos has begun. As substitute materials for asbestos fibers, inorganic and organic fibers such as glass, polyethylene, polypropylene, nylon, polyacryl, polyvinyl alcohol, carbon, aramide, alumina fibers, etc., have been proposed.

In order to obtain a cement plate having an excellent reinforcing effect and durability in a paper-making method, the following requirements should be met, namely:

(1) fibers having a small diameter should be separated from each other without being entangled and uniformly dispersed in a cement suspension (slurry);

(2) the affinity of the fibers to cement, a factor which greatly affects the paper-making property and the reinforcing effect must be good, and adhesion between fibers and cement must be strong; and (3) durability, particularly alkali resistance, must be excellent.

However, the organic and inorganic fibers which have been attempted to be utilized heretofore do not satisfy all the above described requirements.

For example, fibers such as polyethylene, polypropylene, nylon, etc., have poor strength and poor modulus of elasticity. Further, their adhesive force to a cement matrix is weak. Thus, a satisfactory reinforcing effect cannot be obtained. Glass fibers have poor alkali resistance and an unsatisfactory adhesion force. Further, aramide fibers and carbon fibers have poor dispersibility, weak adhesion force and are costly. Therefore, these fibers have not yet been adopted. Further, polyvinyl alcohol fibers and acrylic fibers promise a bright future as a replacement for asbestos because alkali resistance is good and adhesion to a cement matrix is strong. However, polyvinyl alcohol fibers encounter a problem in cost. Acrylic fibers have poor tensile strength and a poor initial modulus of elasticity; accordingly, hydraulic substances having high efficiencies such as slates having a high bending strength, etc., cannot be obtained from these fibers.

On the other hand, various methods for improving efficiencies, e.g., bending strength, etc., of hydraulic substances reinforced with the aforesaid acrylic fibers have been proposed in recent years. For example, in Japanese Published Unexamined Patent Application No. 170869/82, there is disclosed a hydraulic substance reinforced with acrylic fibers which contain 98 to 100% of acrylonitrile and have a tensile strength of at least 50 CN/tex (5.65 g/d) and a tensile elongation of at most 15%.

However, the acrylic fibers concretely described in the above-cited publication are all obtained by subjecting acrylonitrile type polymers to wet spinning. The thus obtained fibers merely possess a tensile strength of at most 85 CN/tex (9.63 g/d) and a modulus of elasticity of at most 1510 CN/tex (171.1 g/d). The bending strength of cement reinforced with these acrylic fibers is considerably inferior to that of conventional asbestos-reinforced cement. In addition, the bending strength of cement reinforced with acrylic fibers showing the highest tensile strength of 9.63 g/d is not large and a considerably low bending strength is obtained.

It is generally observed that the impact strength of hydraulic substances which are reinforced with synthetic fibers such as acrylic fibers, etc., described above is improved. However, the improvement is unsatisfactory. It has thus been desired to develop hydraulic substances having not only an improved bending strength but also a high impact strength.

On the other hand, various methods for enhancing cohesion between fibers and cement particles in a slurry state of cement and improving a paper-making property have also been proposed. For example, in Japanese Patent Application KOKAI Publication No. 63833/80, there is disclosed a process for producing a cement plate which comprises adding 10 to 800 ppm of a flocculant selected from strong anionic, medium cationic and weakly cationic flocculant to a cement slurry having formulated no asbestos fibers and then subjecting a cement plate to paper-making.

However, cohesion between fibers and cement particles is hardly achieved and the fibers are easily separated from the cement particles by a shearing force at a paper-making step to cause heterogeneity of the slurry. While an improvement in paper-making efficiency is expected to a certain extent in this process, because flocs of cement particles are formed by the addition of the flocculant and thus, outflow of cement particles from a wire cylinder is prevented at the paper-making step, no improvement in properties of the thus obtained cement plate after molding can be expected.

Furthermore, a process for reinforcement of cement materials using polyvinyl alcohol synthetic fibers having coated thereon 0.01 to 3 wt % of anionic and/or nonionic surfactants and a cationic oil is disclosed in Japanese Patent Application KOKAI Publication No. 134553/81. In Japanese Patent Application KOKAI Publication No. 134554/81, a process which comprises using a cationic oil and a nonionic or amphoteric surfactant in combination as a treating agent is disclosed.

However, when these processes are used, they encounter a drawback due to unsatisfactory paper-making efficiency. Namely, due to unsatisfactory cohesion between fibers and cement particles in a slurry state, paper-making cannot be performed efficiently. The effect of improving adhesion between fibers and cement particles in cement articles, that is, the effect of improving bending strength, can be expected to a certain extent.

As described above, in the case of preparing cement plates through a paper-making process, it is important that cement particles be firmly fixed to the surfaces of fibers in large quantities at a paper-making step, a uniformly dispersed slurry be obtained and, at the same time, a felt material having good uniformity be formed by a cylinder mould machine or a fourdrinier machine while maintaining the firmly fixed state and the uniformly dispersed state. In the prior art processes, however, cohesion between fibers and cement particles in a slurry state or dispersibility of the slurry is insufficient so that paper-making efficiency is not always satisfactory. As a result, it has not been possible to improve the properties of a cement plate.

As a result of extensive investigations in hydraulic substances, the present inventors have discovered the present invention.

An object of the present invention is to provide hydraulic substances having excellent bending strength and excellent resistance to impact, at a low cost, and a process for production of such hydraulic substances with extremely good paper-making efficiency.

SUMMARY OF THE INVENTION

The objects of the present invention are achieved by using high tenacity AN fibers which have a smooth surface, a tensile strength of at least 10 g/d, an initial modulus of at least 180 g/d and a knot strength of at least 2.2 g/d, and which comprise an AN polymer composed mainly of AN having an intrinsic viscosity of at least 2.5, and by using high tenacity AN fibers obtained by applying to the fibers a nonionic high molecular weight flocculant or cationic high molecular weight flocculant, as reinforcing fibers.

DESCRIPTION OF PREFERRED EMBODIMENTS

The AN fibers used in the present invention are composed of a polymer of a high polymerization degree having an intrinsic viscosity of at least 2.5. Such a polymer of a high polymerization degree is highly oriented toward the fiber axis direction to a high value of 93% or more when expressed by x-ray crystalline orientation degree. By the above characteristic, mechanical properties, for example, physical properties such as a tensile strength of at least 10 g/d, preferably 12 g/d, and a knot strength of 2.2 g/d or more, preferably more than 3.0 g/d, are exhibited. In addition, the fibers used in the present invention possess a minimized drawback at the surface thereof because they have a surface smoothness of at least 7%, preferably 10% or more, generally in the range of 15 to 30%, when expressed in terms of contrast glossiness. In addition, the fibers are excellent in their fineness so that fibers having a high initial modulus and resistant to bending or friction can be obtained.

The degree of orientation is a value calculated by the following formula using a half width value H determined by measuring distribution of diffraction strength in the azimuthal direction, paying attention to crystalline reflection having the maximum strength on the equator line at a scattering angle of 16 to 17, in an x-ray diffraction pattern of AN fibers.

$$\text{Degree of orientation (\%)} = \frac{180 - H}{180} \times 100$$

The term "contrast glossiness" as used herein refers to a value determined by the following measurement method and reflects smoothness of fibers at the surfaces thereof and, at the same time, a dense and homogeneous fiber structure:

A fiber bundle is arranged parallel. At this time, crimped threads are treated with hot water of 90° to 100° C. to remove crimp and make the threads straight. A light is given to the surface of this sample from one direction and, reflection lights are divided into a regular reflection component (a) and a diffuse reflection component (b). A ratio of both components is contrast glossiness.

$$\text{Contrast glossiness} = (1 - b/a) \times 100$$

To produce the fibers having excellent mechanical properties and efficiencies as described above, it is required that the polymerization degree of a polymer constituting the fibers be made markedly high and the polymer be highly oriented to the fiber axis direction. It is thus difficult to prepare the fibers used in the present invention by a wet or dry spinning process most widely adopted for industrially producing AN fibers. It becomes possible to obtain super high tenacity AN fibers used in the present invention only by a dry-jet wet spinning process described below in detail. That is, AN polymers are dissolved in solvents. The resulting spinning solution is once extruded into air or an inert gas, preferably in air, through a spinning nozzle. The extruded multifilaments are introduced into a coagulating bath via a gaseous minute space to cause coagulation there. In combination with this process, further specific steps for the production and for the conditions are adopted, thereby obtaining super high tenacity AN fibers of the present invention.

Hereinafter, the process for production of the AN fibers used in the present invention will be described in detail.

The AN polymers are AN homopolymers or AN copolymers containing at least 90 mol % of AN, preferably 95 to 100 mol % of AN and less than 5 mol %, preferably 0 to 5 mol %, of vinyl compounds copolymerizable with AN. When the amount of the vinyl compounds to be copolymerized exceeds 5 mol %, heat resistance of the resulting fibers is reduced, which is not preferred for the purpose of achieving the objects of the present invention.

Any compound is usable as the above-described vinyl compound and is not particularly limited as far as the compound is copolymerizable with AN. Preferred examples of copolymerizable components include acrylic acid, itaconic acid, methyl acrylate, methyl methacrylate, vinyl acetate, sodium allylsulfonate, sodium methallylsulfonate, sodium p-styrenesulfonate, etc.

These AN polymers are dissolved in a solvent therefor such as an organic solvent, for example, dimethylsulfoxide (DMSO), dimethylformamide (DMA), dimethylacetamide (DMAc), ethylene carbonate, butyl lactone, etc., a concentrated aqueous solution of water soluble inorganic salts such as zinc chloride, calcium chloride, lithium bromide, sodium thiocyanate, etc. The thus obtained polymer solution is used as a spinning solution, i.e., a spinning dope.

It is preferred that the polymer concentration of the spinning solution be in a range of about 5 to about 20 wt %, preferably 10 to 18 wt %. When the polymer concentration is lower than 5 wt %, density and homogeneity of the fibers becomes worse so that properties of strength and elongation are deteriorated and production costs become disadvantageous, which are not preferred. When the polymer concentration exceeds 20 wt %, the viscosity of the spinning solution becomes excessively high so that the stability of the spinning solution and fiber-forming property become worse, which is not preferred.

It is required that the viscosity of the spinning solution be at least 1,500 poise at 45° C., preferably 3,000 to 10,000 poise. When the viscosity of the spinning solution is lower than 1,500 poise at 45° C., a coagulation structure becomes worse so that strength decreases.

The thus adjusted spinning solution is subjected to dry-jet wet spinning process. In this case, it is preferred that the distance between a nozzle surface and the liquid surface of a coagulating bath be in the range of about 1 to about 20 mm, preferably 2 to 10 mm.

As a coagulating bath, there is used water or an aqueous solution of the aforesaid AN polymers in solvents used for wet or dry-jet wet spinning processes of known AN fibers, for example, an aqueous solution of the solvent having a concentration of 10 to 80 wt % and a temperature of 0° to 35° C.

The thus obtained coagulated filaments are subjected to conventional, known post treatments, that is, treatments such as washing, drawing, drying, etc. In the present invention, it is required that the fibers after drying be subjected to dry drawing. Only by dry drawing the AN fibers obtained by the dry-jet wet spinning process, is it possible to convert AN fibers into the AN fibers having a smooth surface composed of a highly polymerized polymer having an intrinsic viscosity of at least 2.5 or more and having a high orientation of 93% or more in the x-ray crystalline orientation, i.e., the ultra high tenacity fibers.

That is, the dry drawing is a process which comprises, after coagulation, first drawing to about 2 to 10 times, preferably 3 to 6 times, and drying, then drawing the filaments on hot roller, hot plates or in a heated air bath to a temperature of 160° to 250° C., preferably 180° to 220° C. while maintaining the filaments in a drawing tension of 1 g/d or more, preferably 1.5 to 2.5 g/d.

As concrete means for dry drawing, it is preferred that drawing be performed using a tubular heating cylinder capable of supplying and exhausting heating air, while passing filaments through the heating cylinder maintained at a fixed temperature.

The drawing magnification in the heat drawing varies depending upon drawing hysteresis of the filaments to be subjected to heat drawing and is set forth in the range wherein the total drawing magnification of the drawn threads finally obtained becomes approximately 10 to 25 times. Further, it is preferred that a single yarn denier be less than 3.0 d, preferably less than 2.0 d.

It is desired that the length of the reinforcing fibers be in the range of 0.5 to 15 mm. Further it is appropriate that the amount of the fibers to be incorporated into a cement be in the range of 0.5 to 5 wt %. When the amount is less than 0.5 wt %, a sufficient reinforcing effect is not exhibited. When the amount exceeds the upper limit, dispersibility becomes worse so that any improvement in the reinforcing effect cannot be expected.

The use of fibryl fibers such as pulps in addition to the aforesaid AN fibers can prevent loss of cement at the paper-making step and as a result, efficiency of paper-making is more improved.

For the same purpose, AN type fibryl fibers, aromatic polyamide type fibryl fibers and a small quantity of asbestos, etc., can also be used in combination.

The term "hydraulic substance" as used in the present invention refers to an inorganic substance which is hardened by hydration. Examples of such hydraulic substances include portland cement, alumina cement, slug cement, silica cement, gypsum, calcium silicate, etc. In order to impart a porous structure or a light-weight structure to these hydraulic substances, perlite, sand balloons, glass balloons, etc., may also be incorporated.

The high molecular flocculants which can be employed in the present invention include the following: nonionic high molecular flocculants which are high molecular electrolytes having many neutral polar groups such as a —CONH$_2$— group, an —O— group, etc., for example, polyacrylamide, polyethylene oxide, starch, gujar gum, locus bean gum, gelatin, etc. Of these, particularly preferred is polyacrylamide. Cationic high molecular flocculants which are high molecular electrolytes having cationic functional groups such as an amine, a salt of an amine, a quaternary salt, etc., for example, polyalkylaminoacrylates or methacrylates, copolymers of aminoalkyl acrylates or methacrylates and acrylamide, Mannich-modified polyacrylamides, polyethyleneimine, polyamine, cyclized polymers of diallyl ammonium halides and copolymers thereof with sulfur dioxide, polyvinylimidazoline, water soluble aniline resin hydrochloride, hexamethylenediamine-epichlorohydrin polycondensate, chitosan, etc. Of these high molecular flocculants, polyacrylamide type, polyacrylate type and polymethacrylate type are particularly preferred from viewpoints of alkali resistance and flocculating property.

It is appropriate that a molecular weight of these high molecular flocculants be in the range of 1,000,000 to 15,000,000, preferably 3,000,000 to 10,000,000, from a viewpoint of bridging and adsorption to cement particles as will be later described.

It is preferred that the amount (in terms of dry weight) of these high molecular flocculants deposited onto, or adhered to, the fiber be in the range of 0.01 to 1 wt %, desirably 0.05 to 0.6 wt %, based on the weight of the fiber. When the amount is less than the lower limit, adhesion between the cement matrix and fibers is poor. When the amount is larger than the upper limit, fibers are adhered to each other so that dispersibility of the fibers in a cement slurry is seriously reduced.

Application of the high molecular flocculants to fibers is effected by immersing fibers in an about 0.1% aqueous solution of a high molecular flocculant and then dehydrating appropriately by means of a squeezing roller, centrifugation, etc. In this case, it is desired that the dehydrated fibers are kept in moist state, the drying after applying the aqueous solution of a high molecular flocculant to fibers results in reduction of dispersibility in water and cohesion between fibers and cement particles.

As such, fiber-reinforced hydraulic substances are prepared by uniformly dispersing the high tenacity AN fibers having a high modulus of elasticity, to which the nonionic or cationic high molecular flocculant has been applied, in water together with a hydraulic substance such as cement or the like, then adding an anionic high molecular flocculant to the resulting slurry to make cement particles flocculate and adsorb to the surface of the aforesaid AN fibers, and subjecting the resulting slurry to paper-making.

A method for cohesion between fibers and cement particles in the present invention involves utilization of a flocculating effect of the high molecular flocculant, which is effected by coagulation due to neutralization of electric charges and bridging by high molecular chains. That is, cement particles are flocculated with the anionic high molecular flocculant to form a floc. At the same time, the floc is adsorbed to and bridged with the nonionic or cationic high molecular flocculant at the surface of the fibers, thereby to effect cohesion between the fibers and the cement particles. Accordingly, the ionic nature of the high molecular flocculant to be applied to the fibers is desirably cationic but, nonionic high molecular flocculants can also be employed since the bridging effect of the high molecular chains also contributes to flocculation. However, when anionic high molecular flocculants having counter ions are applied to the fibers, electric repellency is generated, resulting in failure to achieve cohesion between the fibers and the cement particles. In this sense, it is important in the cohesion of the present invention that the molecular chains of the high molecular flocculants be both sufficiently large.

As the anionic high molecular flocculants which can be used for adsorption of cement particles to the surface of the fibers an bridging the same with the surface of the fibers, high molecular electrolytes containing a $-CO_2-$ group are preferred. Examples of such anionic high molecular flocculants include polyacrylamide partial hydrolysate, sodium polyacrylate, copolymer of sodium acrylate and acrylic amide, sulfomethylated polyacrylamide, sodium alginate, CMC-Na, etc. Of these, particularly preferred are polyacrylamide type such as polyacrylamide partial hydrolysate, copolymers of acrylic amide and sodium acrylate, etc.

It is preferred that the molecular weight be in the range of 1,000,000 to 15,000,000. When the molecular weight is outside this range, flocculation capability is markedly reduced, or, conversely, floc becomes coarse to cause non-uniformity of the resulting slurry. This causes reduction in paper-making efficiency.

On the other hand, when the molecular weight of the aforesaid anionic high molecular flocculants is particularly in the range of 4,000,000 to 9,000,000, a floc of cement particles adsorbed to and bridged with the surface of the fibers becomes a fine and appropriate size, dispersibility of the fibers and slurry is improved and bending strength of the obtained cement plate markedly increases.

It is appropriate that the amount of the anionic high molecular flocculant to be added be 30 to 600 ppm based on the solid content in the slurry, in view of flocculating efficiency and paper-making efficiency. Further the use of inorganic flocculants in combination with the aforesaid anionic high molecular flocculant results in a fine floc which is to be formed when cohesion occurs. In addition, the floc becomes strong and has a strong resistance to a shearing force at a step of preparing a slate by the paper-making process. As a result, paper-making efficiency is further improved. Examples of the inorganic flocculants used herein include substances which form cationic colloid ions in water, such as aluminum sulfate, sodium aluminate, ferrous sulfate, ferric sulfate, ferric chloride, aluminum polychloride, etc. Of these, aluminum sulfate is preferred.

Further for purposes of exhibiting the efficiency of the aforesaid high molecular flocculants and inorganic flocculants and enhancing the effects of the flocculants, flocculating aids such as slake lime, soda ash, sodium silicate, bentonite, fly ash, etc., can, of course, also be used.

In the method of the present invention using a flocculating effect of high molecular flocculants, acrylic fibers having a modulus of elasticity of 120 g/d or more and a tensile strength of 5 g/d or more, preferably 6 g/d or more, can be used. Suitable fibers, of course, include the high tenacity AN fibers having a high modulus of elasticity as described herein above.

The hydraulic substances of the present invention have not only a high bending strength but also a large work load of rupture in bending and a large impact strength, i.e., are excellent in capability of absorbing energy in rupture, since the hydraulic substances are reinforced with the high tenacity acrylic fibers having a high modulus of elasticity. The highly efficient hydraulic substances of the present invention are not ever achieved with conventional acrylic fibers but can be accomplished by using the high tenacity acrylic fibers having a high modulus of elasticity for the first time. This is assumed to be not only because the acrylic reinforcing fibers have a high tenacity and a high modulus of elasticity but also because both the smoothness at the surface of the fibers and the uniformity of the structure of the fibers in the inner and outer layers thereof act effectively. Accordingly, the hydraulic substances reinforced with the acrylic fibers of the present invention have a bending strength comparable to conventional asbestos-reinforced substances and, at the same time, possess much better impact resistance.

In the present invention, a slurry in which large quantities of cement particles are fixed to the surface of the fibers, cohesion is extremely strong and dispersibility is good can be obtained by forming an aqueous suspension from AN fibers having applied thereto the nonionic or cationic high molecular flocculant and cement particles as described above and adding the anionic high molecular flocculant thereto. This slurry can sufficiently withstand the shearing force at the paper-making step. Accordingly, loss of cement which passes through a wire mesh upon paper-making is minimized, the solid content to be formed on the wire mesh increases and an efficiency of paper-making can be greatly improved. Further because of good dispersibility of the fibers and good adhesion to cement, the impact strength and the bending strength of the thus formed cement plate by paper-making is large and a highly reinforcing effect can be attained. Therefore, the process for production of the fiber-reinforced cement plate in accordance with the present invention is extremely useful for manufacturing various slate products, molding articles, etc., in building and construction fields.

EXAMPLES 1 TO 3 AND COMPARISON EXAMPLES 1 TO 4

100% AN was subjected to solution polymerization in DSMO to prepare four kinds of AN polymers having intrinsic viscosities of 1.3, 2.6, 3.8 and 5.5, respectively.

Viscosities (45° C.) of these four polymers were adjusted to approximately 3,000 poise, respectively, to prepare four spinning solutions. Using the thus obtained four spinning solutions, spinning was conducted by two processes, i.e., a wet spinning process and a dry-jet wet spinning process. In each spinning process, a 55% DSMO aqueous solution at 20° C. was used as a coagulating bath.

In the case of the dry-jet wet spinning process, the distance between a spinning nozzle and the liquid surface of the coagulating bath was set to 5 mm and, the distance from the liquid surface of the coagulating bath to a focusing guide was set to 400 mm.

After washing the obtained undrawn filaments with water, the filaments were drawn by 5 times in hot water. After imparting an oil thereto, the drawn filaments were dried at 130° C. to render the structure dense and homogeneous. Then, the filaments were drawn in a dry heating tube having a temperature atmosphere of 180° to 200° C. The drawing filaments having the maximum drawing magnification of 90% were subjected to sampling and, physical properties of the fibers were measured. The results are shown in Table 1 below.

The degree of crystalline orientation of Fiber A, B and C was 94.7%, 94.5% and 94.5%, respectively. The contrast glossiness was 20.3%, 22.5% and 23.1%, respectively, which were all higher than wide-angle of crystalline orientation of 91.7% and relative glossiness of 5.3% of Fiber F.

TABLE 1

| Fiber | Spinning Method | Intrinsic Viscosity | Strength (g/d) | Initial Modulus (g/d) | Knot Strength (g/d) |
|---|---|---|---|---|---|
| A | dry-jet wet | 5.5 | 13.1 | 231 | 3.5 |
| B | dry-jet wet | 3.8 | 12.8 | 225 | 3.1 |
| C | dry-jet wet | 2.6 | 10.8 | 214 | 2.5 |
| D | dry-jet wet | 1.3 | 6.9 | 153 | 1.1 |
| E | wet | 3.8 | 7.3 | 161 | 1.7 |
| F | wet | 1.3 | 5.8 | 128 | 0.9 |

Next, to 10 g each of AN fibers shown in Table 1, which had been cut into a fiber length of 5 mm, were added 10 g of craft pulp, 10 g of Ca(OH)$_2$, 10 g of Al$_2$(SO$_4$)$_3$ and 10 l of water, respectively. After stirring the mixtures, 460 g of portland cement was added thereto followed by stirring again. Subsequently, 200 ppm each of anionic polyacrylamide type cement flocculants (made by Sanyo Kasei, "Sanfloc" AH-330P) was added to the mixtures, respectively, with stirring at a low speed to prepare slurries having formed a floc of cement particles on the surface of the fibers. Each of the slurries obtained was transferred in a mold of 20 cm × 25 cm on which a wire of 50 mesh was put. After filtering, the system was pressed for 1 minute under pressure of 100 kg/cm$^2$ to mold cement plates having a thickness of about 6 mm. An amount of the fibers to be mixed in each of the cement plates was 2 wt %, respectively. In the case of asbestos, a cement plate was molded only from asbestos (15 wt %) and cement.

Next, curing was performed at 20° C. at 100% RH for 1 day and then in water at 20° C. for 6 days.

MEASUREMENT OF BENDING STRENGTH AND WORK LOAD OF RUPTURE IN BENDING

A test piece was cut out of each of the cement plates. Bending strength was measured on the test piece in accordance with JIS-X-6911. Work load of rupture in bending was calculated from a stress-strain diagram in the bending rupture test.

MEASUREMENT OF IMPACT STRENGTH

A test piece cut out of each of the cement plates was subjected to impact test in accordance with JIS-X-7111 to determine impact strength.

MEASUREMENT OF SPECIFIC GRAVITY

With respect to a test piece cut out of each of the cement plates, absolute dry weight, water holding weight and weight in water were measured. According to the following equation, a bulk density was calculated:

$$\text{specific gravity} = \frac{\text{absolute dry weight}}{\text{water holding weight} - \text{weight in water}}.$$

Properties of each of the cement plates are shown in Table 2 below.

The cement plates of the present invention which had been reinforced with high tenacity acrylic fibers having a high modulus of elasticity possess a high bending strength that cannot be achieved with conventional acrylic fibers. At the same time, the fiber-reinforced cement plates of the present invention showed greatly increased work load of rupture in bending and impact strength and were excellent in capability of absorbing energy in rupture. In addition, the cement plates of the present invention exhibited a bending strength comparable to conventional asbestos-reinforced cement plates and simultaneously, showed much better impact resistance.

TABLE 2

| | | Property of Cement Plate | | | |
|---|---|---|---|---|---|
| Example | Reinforcing Fiber | Specific Gravity | Bending Strength (Kg/cm$^2$) | Work Load of Rupture in Bending (Kg · cm/cm$^2$) | Sharpy Impact Strength (Kg · cm/cm$^2$) |
| 1 | A | 1.59 | 230 | 2.84 | 3.04 |
| 2 | B | 1.58 | 222 | 2.80 | 3.02 |
| 3 | C | 1.60 | 213 | 2.64 | 2.85 |
| Comp. 1 | D | 1.58 | 175 | 2.35 | 2.60 |
| Comp. 2 | E | 1.58 | 175 | 1.22 | 2.07 |
| Comp. 3 | F | 1.57 | 158 | 1.20 | 2.05 |
| Comp. 4 | Asbestos | 1.60 | 211 | 0.51 | 1.10 |

EXAMPLES 4 TO 6 AND COMPARISON EXAMPLES 5 TO 7

Using high molecular flocculants (Examples 4 to 6, Comparison Example 5), surfactants or oils (Comparison Examples 6 and 7) shown in Table 3 below, aqueous dispersions containing a 0.1% effective components were prepared. The Fiber B shown in Table 1 was immersed in the aqueous dispersions at room temperature for 5 minutes. Using a centrifugal separator, excess moisture was removed. At this time, an amount of the flocculants, etc., to be applied was about 0.1 wt %. Then, the AN fibers were cut into a length of 5 mm without drying.

In order to determine cohesion between the obtained fibers and cement particles, the following method was used for measurement. Namely, 0.2 g (provided that 0.2 g each of $Al_2(SO_4)_3$ and $Ca(OH)_2$ was added only in Example 4) of the cut fiber obtained above was added to 0.2 l of water. After stirring the mixtures, 9.2 g of portland cement was added to the mixtures followed by stirring again. Then, 200 ppm each of an anionic cement flocculant (polyacrylamide partial hydrolysate, made by Sanyo Kasei Co., Ltd., strongly anionic "Sanfloc" AN-330P) was added to the mixtures, respectively, based on each of the solid contents while stirring at a low speed to fix cement particles onto the surface of the fibers. After each of the thus prepared slurries was stirred for 0 to 15 minutes using a stirrer of 400 rpm, the mixtures were filtered on a wire net of 40 mesh. The solids on the wire net were dried at 105° C. and the weights were measured to determine a cement retention rate. The results are shown in Table 3 below.

Next, cement plates were molded in a manner similar to Example 1 and, specific gravity and bending strength of each of the cement plates were measured. The results are also shown in Table 3 below.

As is evident from the measurement results on Examples 4 to 6 and Comparison Examples 5 to 7 shown in Table 3 below, when the fibers to which the nonionic or cationic high molecular flocculants were applied as in the present invention were used, the systems of the present invention are excellent in paper-making efficiency since the cement retention rate was large and the cement particles were fixed firmly onto the surface of the fibers in large quantities. In addition, the bending strength is large and the coming out of fibers on the face of the ruptured cement plates are not observed. On the other hand, in the cement plate obtained in Comparison Example 5 to which the anionic high molecular flocculant was applied, the cement retention rate was small and the properties of the cement plate were also poor. Further, in the cement plates obtained in Comparison Examples 6 and 7 to which a conventional water-dispersible surfactant or oil were applied, the cement retention rate was small and the properties of the cement plates were poor, irrespective of the ionic nature.

TABLE 3

| | Kind of High Molecular Flocculant and Surfactant (oil agent) | Ionic Nature | Molecular Weight | Cement Retention Rate (wt %) Stirring Time (minute) | | | | Property of Cement Plate | |
|---|---|---|---|---|---|---|---|---|---|
| | | | | 0 | 5 | 10 | 15 | Specific Gravity | Bending Strength (Kg/cm$^2$) |
| Example 4 | Polydimethylaminoethyl methacrylate "Orfloc" OX-101 Organo Co., Ltd. | cation | 7,500,000 | 85 (90)* | 66 (74)* | 50 (66)* | 36 (60)* | 1.59 | 243 |
| Example 5 | Mannich-modified polyacrylamide "Hi-moloc" M-566H Kyoritsu Yuki Co., Ltd. | cation | 8,000,000 | 77 | 56 | 42 | 32 | 1.59 | 238 |
| Example 6 | Polyacrylamide "Hi-moloc" SS-200H Kyoritsu Yuki Co., Ltd. | nonion | 11,000,000 | 70 | 50 | 34 | 28 | 1.58 | 232 |
| Comparison Example 5 | Polyacrylamide partial hydrolysate "Sanfloc" AH-330P Sanyo Kasei Co., Ltd. | anion | >10,000,000 | 50 | 20 | 14 | 8 | 1.60 | 215 |
| Comparison Example 6 | Acrylamide quaternary ammonium salt TY-4 Yoshimura Yuka Co., Ltd. | cation | 500 | 50 | 4 | 4 | 4 | 1.59 | 212 |
| Comparison Example 7 | EO adduct of dodecyl phenyl ether "Dodecapole 90" Sanyo Kasei Co., Ltd. | nonion | 700 | 10 | 4 | 4 | 4 | 1.60 | 212 |

*containing $Al_2(SO_4)_3$ and $Ca(OH)_2$

EXAMPLES 7 TO 11 AND COMPARISON EXAMPLES 8 AND 9

As AN fibers, the Fiber B shown in Table 1 was used. As a cationic high molecular flocculant to be applied to the fibers, polydimethylaminoethyl methacrylate (strongly cationic sample H) having a molecular weight of 3,000,000 was used. As cement flocculants used for adsorbing and bridging cement particles onto the surface of the fibers, anionic, nonionic and cationic high molecular flocculants as shown in Table 4 below were used. Otherwise in quite the same manner as in Example 4, slurries were prepared and measurements of cohesion, molding of cement plates and bending test on the cement plates were performed. Results of respective measurements are shown in Table 4 below.

In case that cement particles were fixed onto the surface of the fibers using the anionic high molecular flocculants as in the present invention, the cement retention rate is large and the bending strength of the cement plates is large. In case of using the anionic high molecular flocculants having molecular weight of 5,000,000 and 7,500,000, cement plates having high bending strength and good properties were obtained. On the other hand, in case that the nonionic or cationic high molecular flocculants are used as cement flocculants, the cement retention rate was small and the properties of the cement plates were poor.

TABLE 4

| | Kind of Cement Flocculant | | | Cement Retention Rate (wt %) Stirring Time (minute) | | | | Property of Cement Plate | |
|---|---|---|---|---|---|---|---|---|---|
| | | Ionic Nature | Molecular Weight | 0 | 5 | 10 | 15 | Specific Gravity | Bending Strength (Kg/cm$^2$) |
| Example 7 | Polyacrylamide partial hydrolysate (strongly anionic sample AS-5) | anion | 3,000,000 | 40 (70) | 31 (54) | 24 (43) | 20 (35) | 1.58 | 247 |
| Example 8 | same as above (strongly anionic) sample B) | anion | 5,000,000 | 71 (80) | 52 (69) | 40 (57) | 31 (50) | 1.60 | 264 |
| Example 9 | same as above (strongly anionic sample AS-3) | anion | 7,500,000 | 76 (85) | 59 (72) | 43 (63) | 35 (57) | 1.59 | 259 |
| Example 10 | same as above (strongly anionic) sample AS-2) | anion | 10,000,000 | 82 (90) | 62 (75) | 47 (65) | 37 (60) | 1.59 | 245 |
| Example 11 | same as above (strongly anionic) sample AS-1) | anion | 15,000,000 | 86 (95) | 65 (80) | 50 (70) | 39 (62) | 1.60 | 241 |
| Comparison Example 8 | Polyacrylamide "Sanfloc" N-OP Sanyo Kasei Co., Ltd. | nonion | 5,000,000 | 56 (80) | 27 (48) | 16 (39) | 13 (35) | 1.58 | 225 |
| Comparison Example 9 | Polydimethylaminoethyl methacrylate "Orfloc" OX-101 organo Co., Ltd. | cation | 7,500,000 | 18 (30) | 14 (15) | 11 (13) | 10 (11) | 1.57 | 214 |

COMPARISON EXAMPLES 10 AND 11

Using alkali-resistant glass fibers having a fiber length of 5 mm, a cationic high molecular flocculant, polydimethyl-aminoethyl methacrylate, having a molecular weight of 3,000,000 was applied thereto in a manner similar to Example 4 (except that the amount of the fibers to be mixed was adjusted to have the same volume percentage as in Example 4). As a cement flocculant, an anionic high molecular flocculant, polyacrylamide partial hydrolysate (strongly anionic sample B), having a molecular weight of 5,000,000 was used. Using this 10 flocculant, cement particles were adsorbed to and bridged with the surface of the fibers to prepare slurries. Measurements of cohesion, molding of cement plates and bending test on the cement plates were performed. The results are shown in Table 5 below.

The effect was less on the glass fibers. Both the cement retention rate and bending strength of the cement plates were poor.

What is claimed is:

1. A fiber-reinforced hydraulic substance comprising a hydraulic substance and, as a reinforcing fiber, a dry-jet wet spun high tenacity acrylonitrile (AN) fiber of an acrylonitrile polymer mainly composed of acrylonitrile having an intrinsic viscosity of at least 2.5, said acrylonitrile (AN) fiber having an X-ray crystalline orientation of at least 93%, a tensile strength of at least 10 g/d, an initial modulus of at least 180 g/d, a knot strength of at least 2.2 g/d and a contrast glossiness of at least 10%.

2. A hydraulic substance as claimed in claim 1, wherein the tensile strength of said acrylonitrile (AN) fiber is at least 12 g/d.

3. A hydraulic substance as claimed in claim 1, wherein said acrylonitrile (AN) fiber has a modulus of tensile elasticity of more than 200 g/d and a knot strength of more than 3 g/d.

4. A hydraulic substance as claimed in claim 1, wherein said acrylonitrile (AN) fiber is coated with a nonionic high molecular flocculant or a cationic high molecular flocculant.

5. The hydraulic substance as claimed in claim 4, wherein the molecular weight of said high molecular flocculant is 1,000,000 to 15,000,000.

* * * * *

TABLE 5

| | High Molecular Flocculant to be adhered to fiber | Cement Flocculant | Cement Retention Rate (wt %) Stirring Time (minute) | | | | Property of Cement Plate | |
|---|---|---|---|---|---|---|---|---|
| | | | 0 | 5 | 10 | 15 | Specific Gravity | Bending Strength (Kg/cm$^2$) |
| Comparison Example 10 | Polydimethylamioethyl methacrylate (molecular weight: 3,000,000 strongly cationic sample H) | Polyacrylamide partial hydrolysate (molecular weight: 5,000,000, strongly anionic sample H) | 58 | 26 | 19 | 16 | 1.60 | 192 |
| Comparison Example 11 | None | same as above | 55 | 24 | 15 | 14 | 1.60 | 190 |